United States Patent
Balaraman et al.

(10) Patent No.: US 12,229,132 B2
(45) Date of Patent: Feb. 18, 2025

(54) EXECUTION OF QUERY PLANS

(71) Applicant: Hewlett Packard Enterprise Development LP, Houston, TX (US)

(72) Inventors: Krishnamoorthy Balaraman, Karnataka (IN); Abhijeet Walimbe, Karnataka (IN); Suresh Soundararajan, Karnataka (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 344 days.

(21) Appl. No.: 17/224,832

(22) Filed: Apr. 7, 2021

(65) Prior Publication Data
US 2022/0035812 A1 Feb. 3, 2022

(30) Foreign Application Priority Data
Jul. 31, 2020 (IN) .............................. 202041032905

(51) Int. Cl.
*G06F 16/2453* (2019.01)

(52) U.S. Cl.
CPC .. *G06F 16/24542* (2019.01); *G06F 16/24535* (2019.01)

(58) Field of Classification Search
None
See application file for complete search history.

(56) References Cited

U.S. PATENT DOCUMENTS

| | | | |
|---|---|---|---|
| 5,943,666 A * | 8/1999 | Kleewein .......... | G06F 16/24542 |
| 7,979,422 B2 | 7/2011 | Belknap et al. | |
| 10,423,619 B2 | 9/2019 | Merker et al. | |
| 10,496,646 B2 | 12/2019 | Hill | |
| 2008/0256024 A1 * | 10/2008 | Downer ............ | G06F 16/24542 |
| 2008/0256025 A1 * | 10/2008 | Bestgen ................ | G06F 16/903 |
| | | | 707/E17.135 |
| 2009/0254916 A1 * | 10/2009 | Bose .................... | G06F 16/2455 |
| | | | 718/104 |
| 2009/0327216 A1 | 12/2009 | Brown et al. | |
| 2010/0235349 A1 * | 9/2010 | Kuno .................... | G06F 16/217 |
| | | | 707/718 |
| 2015/0261819 A1 * | 9/2015 | Cheng ............... | G06F 16/90335 |
| | | | 707/718 |
| 2018/0173753 A1 * | 6/2018 | Pei ....................... | G06F 16/2246 |
| 2018/0260439 A1 * | 9/2018 | Beier ................. | G06F 16/2282 |
| 2019/0042621 A1 * | 2/2019 | Qiu .................... | G06F 16/24532 |
| 2019/0384844 A1 * | 12/2019 | Ding ................. | G06F 16/24539 |
| 2020/0110827 A1 | 4/2020 | Freedman et al. | |
| 2020/0293533 A1 * | 9/2020 | Chen .................... | G06F 16/2282 |
| 2022/0114179 A1 * | 4/2022 | Zheng ................... | H04L 67/568 |

OTHER PUBLICATIONS

Srinivas Karthik et al., "Platform-independent Robust Query Processing," Feb. 6, 2017, 15 Pgs.

* cited by examiner

Primary Examiner — Augustine K. Obisesan
(74) Attorney, Agent, or Firm — Trop, Pruner & Hu, P.C.

(57) ABSTRACT

Example techniques for execution of query plans are described. In an example, a query plan may include a first sub-plan and a second sub-plan that are to provide the same output. One among the first sub-plan and the second sub-plan may be selected during execution of the query plan based on a runtime performance parameter of a component to be involved in execution of the first sub-plan and a runtime performance parameter of a component to be involved in execution of the second sub-plan.

20 Claims, 8 Drawing Sheets

EXECUTION OF QUERY PLANS

BACKGROUND

A database query may be used to retrieve data from a database. The database query may be provided in a declarative language, such as structured query language (SQL), according to which the database query may specify what to compute and not the operations to be performed for the computation. In response to receiving the database query, a query optimizer may generate a query plan, which may specify a series of operations that a database management system is to perform to output a result for the database query. The query optimizer may generate a set of alternative query plans corresponding to the database query and may select a query plan from among the set of query plans for execution based on resources likely to be consumed for execution of the query plans. The selected query plan is then executed by a query executor to retrieve the data.

BRIEF DESCRIPTION OF DRAWINGS

The following detailed description references the figures, wherein.

DETAILED DESCRIPTION

Figure 1:
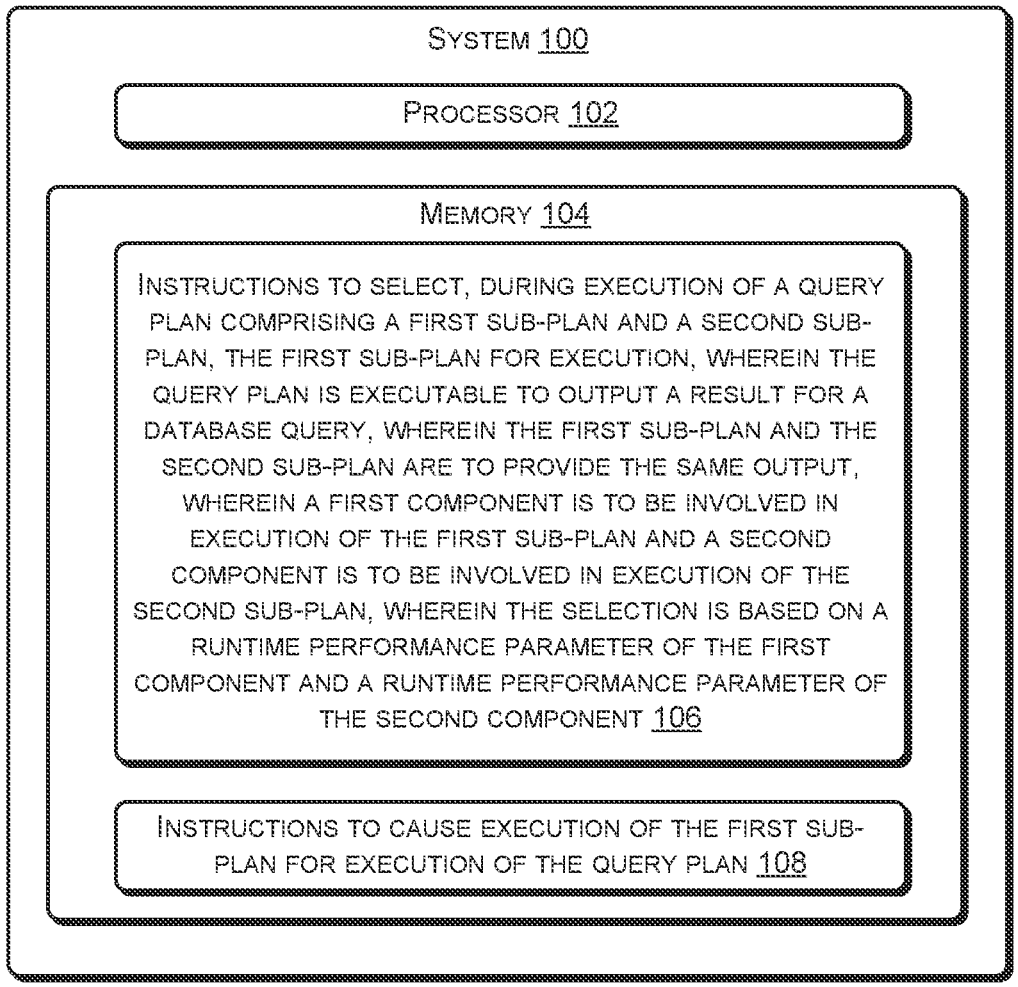
FIG. 1 illustrates a system for executing query plans, according to an example implementation of the present subject matter.

A query optimizer may select a query plan for execution from among in a set of alternative query plans based on an amount of resources likely to be consumed to execute the query plan. The amount of resources likely to be consumed may be estimated based on statistics of database tables to be accessed to execute the query plan. The statistics may include, for example, number of rows in the database tables and number of unique values in a column of the database tables. The selected query plan is subsequently executed by a query executor.

In some cases, the performance parameters of a system used for execution of the query plan may change over time, such as due to an increase in a workload of the system. For example, the latency of a disk that is to be accessed for executing a selected query plan may be high during execution of the query plan. As another example, a busy time of a processor that is to execute a disk process for retrieving data from the disk may be high during execution of the query plan. As a result, the execution of the selected query plan may consume a large amount of time. The amount of time consumed may be a larger than the time that would have been consumed to execute another query plan of the set of alternative query plans.

Further, in some cases, the statistics, based on which the query plan was selected, may have been obsolete at the time of selection of the query plan. For instance, a query plan may have been selected based on an indication that the number of records in a database table is one million, while the number of records may have grown to ten million since the last time the statistics were updated. Accordingly, the selected query plan may consume more amount of resources than it was expected to consume. The resources consumed may be more than the resources that would have been consumed for executing an alternative query plan. Thus, a process of selection of a query plan may be less efficient.

The present subject matter relates to execution of query plans. With the implementations of the present subject matter, the time and resources consumed for execution of query plans may be reduced.

In accordance with an example implementation, a query plan includes a plurality of equivalent sub-plans that are to provide the same output. A component involved in execution of one equivalent sub-plan may be different than that involved in execution of another equivalent sub-plan. For example, a first file, a first disk, or a first processor may be involved in execution of a first sub-plan, while a second file, a second disk, or a second processor may be involved in execution of a second sub-plan. Examples of equivalent sub-plans are a first sub-plan that involves a first join operation of a first copy of an index and a table and a second sub-plan that involves a second join operation of a second copy of the index and the table. The first copy of the index may be stored in the first disk and the second copy of the index may be stored in the second disk. Further, the first join operation may be performed by a first computing device and the second join operation may be performed by a second computing device.

A sub-plan may be selected from amongst the plurality of equivalent sub-plans. The selected sub-plan may then be executed. The selection of the sub-plan may not be performed before commencement of the execution of the query plan. Instead, the selection may be performed at runtime, such as just before one of the equivalent sub-plans is to be executed. In an example, to facilitate selection of the sub-plan at runtime, the query plan may include a sub-plan selection operator that indicates the components involved in execution of each equivalent sub-plan. The execution of the sub-plan selection operator may cause determining the runtime performance parameters of components involved in the equivalent sub-plans.

In an example, the selection of a sub-plan for execution is performed based on runtime performance parameters of the components to be involved in execution of the equivalent sub-plans. A runtime performance parameter of a component may refer to a parameter that indicates the performance of the component at runtime, such as when the query plan is being executed. The performance of a component may indicate the speed with which a task involving the component can be completed, and may depend on the workload of the component. The runtime performance parameters may include, for example, number of accesses of a file per unit time, latency of a disk, and busy time of a processor. For instance, if the first file corresponding to the first sub-plan has a lower number of accesses than the second file, or if a latency of the first disk is less than that of the second disk, or if a busy time of the first processor is less than that of the second processor, the first sub-plan may be selected.

The provision of equivalent sub-plans in a query plan and the selection of a sub-plan to be executed based on runtime performance parameters of components involved in the sub-plan may prevent utilization of overloaded components in the execution of the query plan. Therefore, the time consumed for execution of the query plan may be reduced. The selection based on the runtime performance parameters also reduces the dependence on statistics of database tables, which may be obsolete, for the selection. Therefore, the selection becomes more efficient.

Further, by deferring the selection of an equivalent sub-plan to the time of execution of the sub-plan, it may be ensured that the selection is based on the current performance parameters. The present subject matter may be utilized in static scenarios, where a query plan is generated once, stored, and executed multiple times, as the selection of sub-plans is performed dynamically during execution of the query plan. The present subject matter may also be utilized in dynamic scenarios, in which query plans are generated before an execution and discarded after execution.

The following description refers to the accompanying drawings. Wherever possible, the same reference numbers are used in the drawings and the following description to refer to the same or similar parts. While several examples are described in the description, modifications, adaptations, and other implementations are possible and are intended to be covered herein.

FIG. 1 illustrates a system 100 for executing query plans, according to an example implementation of the present subject matter. The system 100 may be implemented as a computing device, such as a desktop computer, a laptop computer, a server, or the like. The system 100 includes a processor 102 and a memory 104 coupled to the processor 102.

The processor 102 may be implemented as a microprocessor, a microcomputer, a microcontroller, a digital signal processor, a central processing unit, a state machine, a logic circuitry, and/or any device that can manipulate signals based on operational instructions. Among other capabilities, the processor 102 may fetch and execute computer-readable instructions included in the memory 104. The computer-readable instructions may include instructions 106 and instructions 108. The functions of the processor 102 may be provided through the use of dedicated hardware as well as hardware capable of executing machine-readable instructions.

The memory 104 may include any non-transitory computer-readable medium including volatile memory (e.g., RAM), and/or non-volatile memory (e.g., EPROM, flash memory, Memristor, etc.). The memory 104 may also be an external memory unit, such as a flash drive, a compact disk drive, an external hard disk drive, or the like.

In addition to the processor 102 and the memory 104, the system 100 may also include interface(s) and system data (not shown in FIG. 1). The interface(s) may include a variety of instructions-based interfaces and hardware interfaces that allow interaction with a user and with other communication and computing devices, such as network entities, web servers, and external repositories, and peripheral devices. The system data may serve as a repository for storing data that may be fetched, processed, received, or created by the instructions.

In operation, a query plan may be received. The query plan may be executed to provide a result for a database query. The query plan may be provided in the form of instructions that can be executed to obtain the result. In an example, the query plan may be provided in the form of a tree structure, where each node in the tree structure has a corresponding set of instructions. The query plan may be generated by a query optimizer (not shown in FIG. 1) in response to receiving a query from a user or a computing device. The query optimizer may be implemented on the system 100 or on another computing device.

The query plan may include a plurality of sub-plans. A sub-plan, when executed, may provide an output that can be used to obtain the result for the database query. The plurality of sub-plans may include sub-plans that are to provide the same output. The sub-plans that are to provide the same output as each other may be referred to as equivalent sub-plans. Examples of equivalent sub-plans are a first sub-plan and a second sub-plan.

A first component may have to be involved in execution of the first sub-plan and a second component may have to be involved in execution of the second sub-plan. The first component may be, for example, a first processor that is to execute at least a part of the first sub-plan, a first memory coupled to the first processor, a first file that is to be accessed to execute the first sub-plan, or a first disk storing the first file. Similarly, the second component may be, for example, a second processor that is to execute at least a part of the second sub-plan, a second memory coupled to the second processor, a second file that is to be accessed to execute the second sub-plan, or a second disk storing the second file. In an example, more than one of the aforesaid components may be involved in execution of the first and second sub-plans.

The system 100 may select the first sub-plan from among the first sub-plan and the second sub-plan for execution. The selection may be performed during execution of the query plan, i.e., at runtime. The selection may be based on a runtime performance parameter of the first component and a runtime performance parameter of the second component. A runtime performance parameter of a component may refer to a parameter that indicates the performance of the component at runtime, such as when the query plan is being executed. The performance of a component may indicate the speed with which a task involving the component can be completed, and may depend on the workload of the component. In an example, the runtime performance parameter may indicate how busy the component is and may vary dynamically during operation of the component. In an example, if the component is a processor, the runtime performance parameter may be a busy time of the processor, which indicates an amount of time for which the processor is busy executing code.

If the component is a disk, the runtime performance parameters may include, for example, a number of access requests being processed by the disk per unit time, a queue length of the disk, a latency of the disk, a cache hit ratio of a disk buffer of the disk. A queue length of the disk may refer to a number of requests pending with the disk for processing. The latency of the disk may refer to a sum of a seek time and a transfer time of the disk. A disk buffer refers to a memory embedded in the disk that acts as a buffer between the disk and a computing device. A cache hit ratio of the disk buffer may refer to a ratio of a number of cache hits to a number of cache hits and misses of the disk buffer. A high cache hit ratio indicates that less number of disk accesses is to be performed. Accordingly, a high cache hit ratio indicates faster retrieval of data from the disk.

If the component is a file, such as a table or an index, the runtime performance parameter may be, for example, a number of access requests, such as read requests and write requests, for the file per unit time. If the component is a memory, the runtime performance parameter may be an amount of memory capacity that is being utilized for storing instructions and information. In an example, the runtime performance parameter may also indicate the health of a component, such as whether the component is healthy, is corrupted, or has a fault.

In an example, runtime performance parameters of multiple components to be involved in a sub-plan may be considered for selection of a sub-plan. Further, in an example, a latency in communication between computing devices involved in execution of a sub-plan may also be considered for the selection. For instance, consider that a first computing device that manages the first disk, which stores the first file, is to provide records retrieved from the first file to a second computing device for further execution of the first sub-plan or the query plan. Similarly, consider that a third computing device that manages the second disk, which stores the second file, is to provide records retrieved from the second file to a fourth computing device for further execution of the second sub-plan or the query plan. In such a case, a latency in communication between the first computing device and the second device and a latency in communication between the third computing device and the fourth computing device may be considered for selection of the first sub-plan. Still further, in an example, a rental cost of a processor that is to be involved in execution of a sub-plan (e.g., when the execution of the sub-plan happens in a public cloud environment) may also be considered for selection of the sub-plan. For instance, if a first rental cost of the first processor, which is involved in execution of the first sub-plan, is less than a second rental cost of the second processor, the first sub-plan may be more favorably considered for selection.

The selection of the first sub-plan as explained above may be performed when the instructions 106 are executed. Upon the selection, the system 100 may cause execution of the first sub-plan, for example, by instructing another computing device to execute the first sub-plan. The other computing device may be, for example, a computing device that manages a disk storing a file to be accessed for executing the first sub-plan. In another example, the first sub-plan may be executed by the system 100.

To cause execution of the first sub-plan, the system 100 may execute the instructions 108. In an example, the instructions 106 and 108 may be provided as part of the query plan to allow selection of the first sub-plan during execution of the query plan, and not before commencement of the execution.

Figure 2:
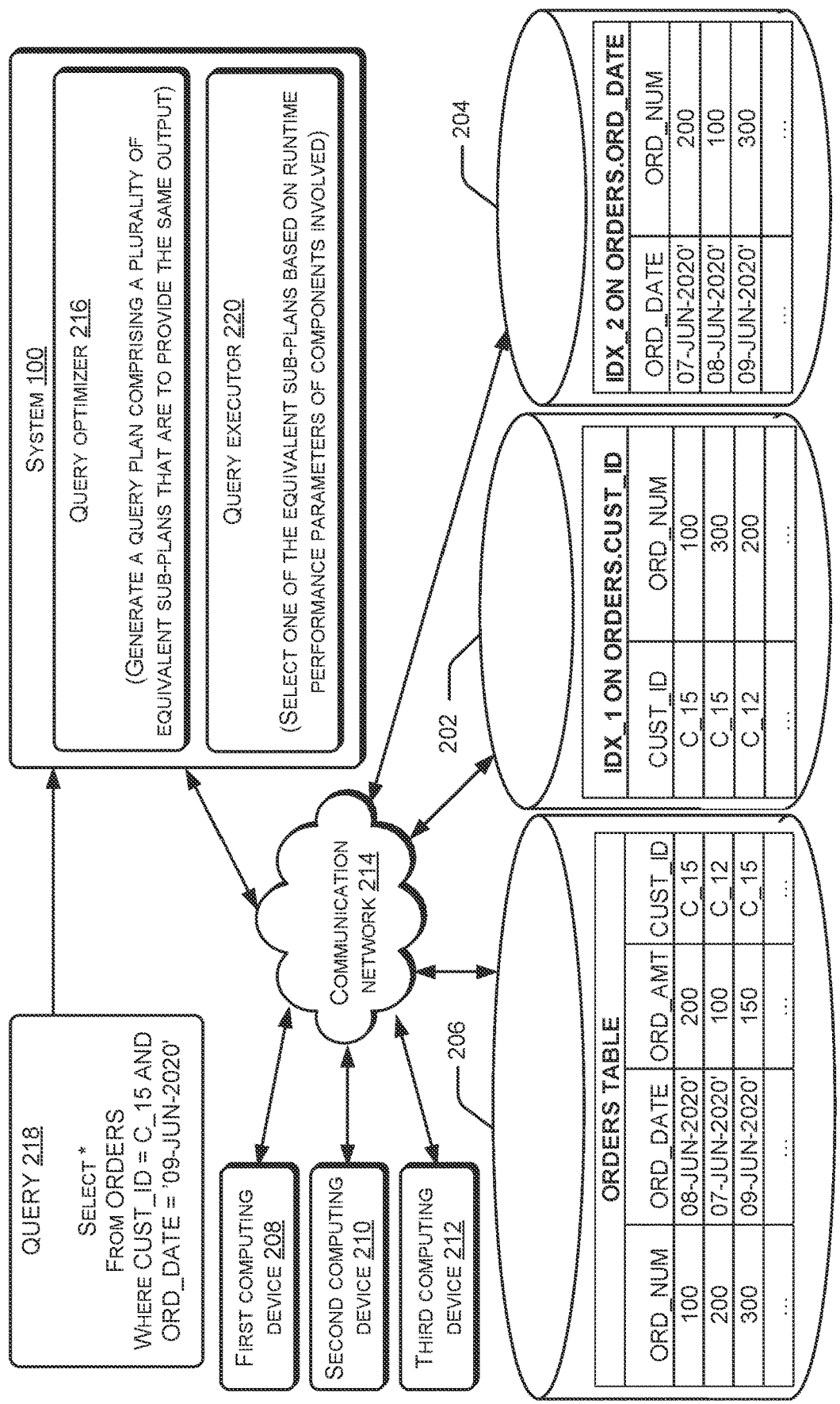
FIG. 2 illustrates a network environment having a system that is to respond to database queries, according to an example implementation of the present subject matter.

FIG. 2 illustrates a network environment 200 having the system 100 that is to respond to database queries, according to an example implementation of the present subject matter. The database queries may also be referred to as queries. The system 100 may receive queries from a client (not shown in FIG. 2) and return results for the queries based on data of a database. In an example, the system 100 may perform the operations to be performed to return the results. In another example, the system 100 may instruct other computing devices to perform the operations and coordinate the performance of the operations and return the results. In a further example, the system 100 may perform some of the operations, while cause performance of other operations by other computing devices.

The data of the database may be organized in various ways, such as using tables and indexes, and may be stored on disks, such as a hard-disk, a solid-state drive (SSD), or the like. The disks may include a first disk 202, a second disk 204, and a third disk 206. The data in the disks may be retrieved and processed by corresponding computing devices that manage the disks. For instance, a first computing device 208 corresponding to the first disk 202 may retrieve data in the first disk 202 for responding to database queries. The first computing device 208 may include a first processor (not shown in FIG. 2) that runs a disk process involved in retrieving data from the first disk 202. Similarly, a second computing device 210 corresponding to the second disk 204 may retrieve data from the second disk 204 and a third computing device 212 corresponding to the third disk 206 may retrieve data from the third disk 206. The second computing device 210 and the third computing device 212 may include a second processor and a third processor respectively (not shown in FIG. 2) that run disk processes corresponding to the second disk 204 and the third disk 206, respectively. In an example, one computing device may manage data stored in multiple disks. For instance, the first computing device 208 may manage retrieval of data from both the first disk 202 and the second disk 204. Further, in an example, the data corresponding to the database may be stored on one disk.

The disks, the computing devices, and the system 100 may be communicate with each other over a communication network 214, which may be a wireless or a wired network, or a combination thereof. The communication network 214 may be a collection of individual networks, interconnected with each other and functioning as a single large network (e.g., the internet or an intranet). Examples of such individual networks include Global System for Mobile Communication (GSM) network, Universal Mobile Telecommunications System (UMTS) network, Personal Communications Service (PCS) network, Time Division Multiple Access (TDMA) network, Code Division Multiple Access (CDMA) network, Next Generation Network (NGN), Public Switched Telephone Network (PSTN), and Integrated Services Digital Network (ISDN). Depending on the technology, the communication network 214 may include various network entities, such as transceivers, gateways, and routers. Although the disks are shown as being connected to the corresponding computing devices over the communication network 214, in an example, the disks may be built into the corresponding computing devices.

In an example, a declarative language, such as structured query language (SQL), may be used for managing and retrieving data of the database. In the case of a declarative language, a query may specify what to compute and not how to compute. For example, the query may specify the records to be retrieved from the database but not how to retrieve them. To determine the manner in which the records are to be retrieved, a query plan may be utilized. The query plan may specify the sequence of steps to be followed to provide the result for the query. The query plan may be generated by a query optimizer 216. In an example, the query optimizer 216 may be implemented by the processor 102 by executing a set of instructions (not shown in FIG. 2). Although the query optimizer 216 is shown as being implemented on a device that is not managing a disk storing data of the database, in other implementations, the query optimizer 216 may be implemented on the first computing device 208, the second computing device 210, or the third computing device 212.

Generally, there may be multiple alternative ways by which a query can be handled. For instance, consider that a query 218 requests for some records in a table titled "ORDERS". The table may also be referred to as ORDERS table and may be stored, for example, on the third disk 206. The ORDERS table may specify the date on which an order was placed ("ORD_DATE"), a value (e.g., a monetary or a quantitative value) associated with the order ("ORD_AMT"), and an identifier of a customer that placed the order ("CUST_ID"). The ORDERS table may have an ORD_NUM column, which indicates an order number corresponding to each order. The ORD_NUM may be the primary key, i.e., the unique identifier for each record, in the ORDERS table. The query 218 may request for those records of the ORDERS table that were placed by a customer having the identifier "C_15" and that were placed on a first date, (e.g., Jun. 9, 2020). The customer having the identifier C_15 may be referred to as the customer C_15.

In an example, a database index, also referred to as an index, may be defined on a column of the ORDERS table. An index is a data structure that improves the speed of data retrieval operations on a database table. The index may be defined, for example, by a database administrator. In an example, an index defined on a column of a table may indicate a value of the primary key of the table corresponding to each value in the column. Further, the index may be ordered based on values of the column. For instance, a first index, IDX_1, may be defined on the column CUST_ID of the ORDERS table. The first index may indicate values of the ORD_NUM (which is the primary key of the ORDERS table) corresponding to each value of CUST_ID on the ORDERS table. Further, the records of the first index may be sorted based on values CUST_ID. For instance, as illustrated, all values corresponding to the customer C_15 may be arranged contiguously on the first index. A second index, IDX_2, may be defined on the column ORD_DATE of the ORDERS table. In an example, the first index may be stored on the first disk 202 and the second index may be stored on the second disk 204.

The first index or the second index may be utilized to reduce the time to respond to the query 218. For instance, using the first index, order numbers of orders placed by the customer C_15 may be identified. Thereafter, the records in the ORDERS table for the identified order numbers may be retrieved. Subsequently, the records that were placed on Jun. 9, 2020 may be filtered from the retrieved records and returned to respond to the query 218. Alternatively, order numbers of orders placed on Jun. 9, 2020 may be identified using the second index. Thereafter, the records in the ORDERS table for the identified order numbers may be retrieved. Subsequently, the records that were placed by the customer C_15 may be filtered from the retrieved records and returned to respond to the query 218.

Thus, as explained above, there are two possible ways by which results may be returned for the query 218. Similarly, there may be a plurality of alternative ways in which results may be returned for other queries. Further, in some cases, there may be a plurality of alternative ways in which an intermediate result, that is to be obtained for obtaining a final result for a query, may be obtained. In accordance with the present subject matter, a query plan generated by the query optimizer 216 may capture a plurality of alternative ways by which a result (final or intermediate) may be obtained in the form of equivalent sub-plans. Two sub-plans may be referred to as being equivalent sub-plans if the execution of the two sub-plans yield the same output. For instance, in the case of the query 218, a first sub-plan may involve utilization of the first index and the second sub-plan may involve utilization of the second index.

A component involved in execution of one of the equivalent sub-plans may be different than that involved in execution of another of the equivalent sub-plans. For instance, as explained earlier, while the first index is involved in execution of the first sub-plan, the second index is involved in execution of the second sub-plan. Similarly, while the first disk 202 and the first processor are involved in execution of the first sub-plan (as the first disk 202 stores the first index and the first processor runs a disk process to retrieve data from the first disk 202), the second disk 204 and the second processor are involved in execution of the second sub-plan.

A query executor 220 may select one of the equivalent sub-plans for execution based on runtime performance parameters of components involved in a sub-plan. For instance, the runtime performance parameters of the first index, the second index, the first disk 202, the second disk 204, the first processor, the second processor, a first memory (memory of the first computing device 208), and a second memory (memory of the second computing device 210) may be determined to select the either the first plan or the second plan for execution. The query executor 220 may be implemented, for example, by the processor 102 by executing a set of instructions (not shown in FIG. 2). Although the query executor 220 is shown as being implemented on a device that is not managing a disk storing data of the database, in other implementations, the query executor 220 may be implemented on the first computing device 208, the second computing device 210, or the third computing device 212.

The selection of an equivalent sub-plan for execution is performed during an execution of the query plan. Such a selection reduces the time consumed for execution of the query plan. This will be explained with the help of an example. Consider that, during execution of a query plan to return a result to the query 218, the first disk 202, the first index, and the first processor are heavily loaded, while the second disk 204, the second index, and the second processor are lightly loaded. In such a case, the second sub-plan, which involves the utilization of the second index, the second processor, and the second disk 204, may be selected for execution. Accordingly, the result may be returned quickly.

In an example, the selection of one of the equivalent sub-plans may be performed by executing a sub-plan selection operator (not shown in FIG. 2) present in a query plan. The sub-plan selection operator may indicate the components to be involved in execution of a sub-plan and may cause determination of the runtime performance parameters of the components. The selection of sub-plans based on the sub-plan selection operator, in accordance with an example, will be explained with reference to FIG. 3.

In an example, the generation of the query plan by the query optimizer 216 may involve generating a plurality of preliminary query plans. Subsequently, the query optimizer 216 may merge the preliminary query plans. The query optimizer 216 may also provide a sub-plan selection operator to allow for selection of one of the equivalent sub-plans. The generation of the query plan, in accordance with an example, will be explained with reference to FIG. 6.

Figure 3:
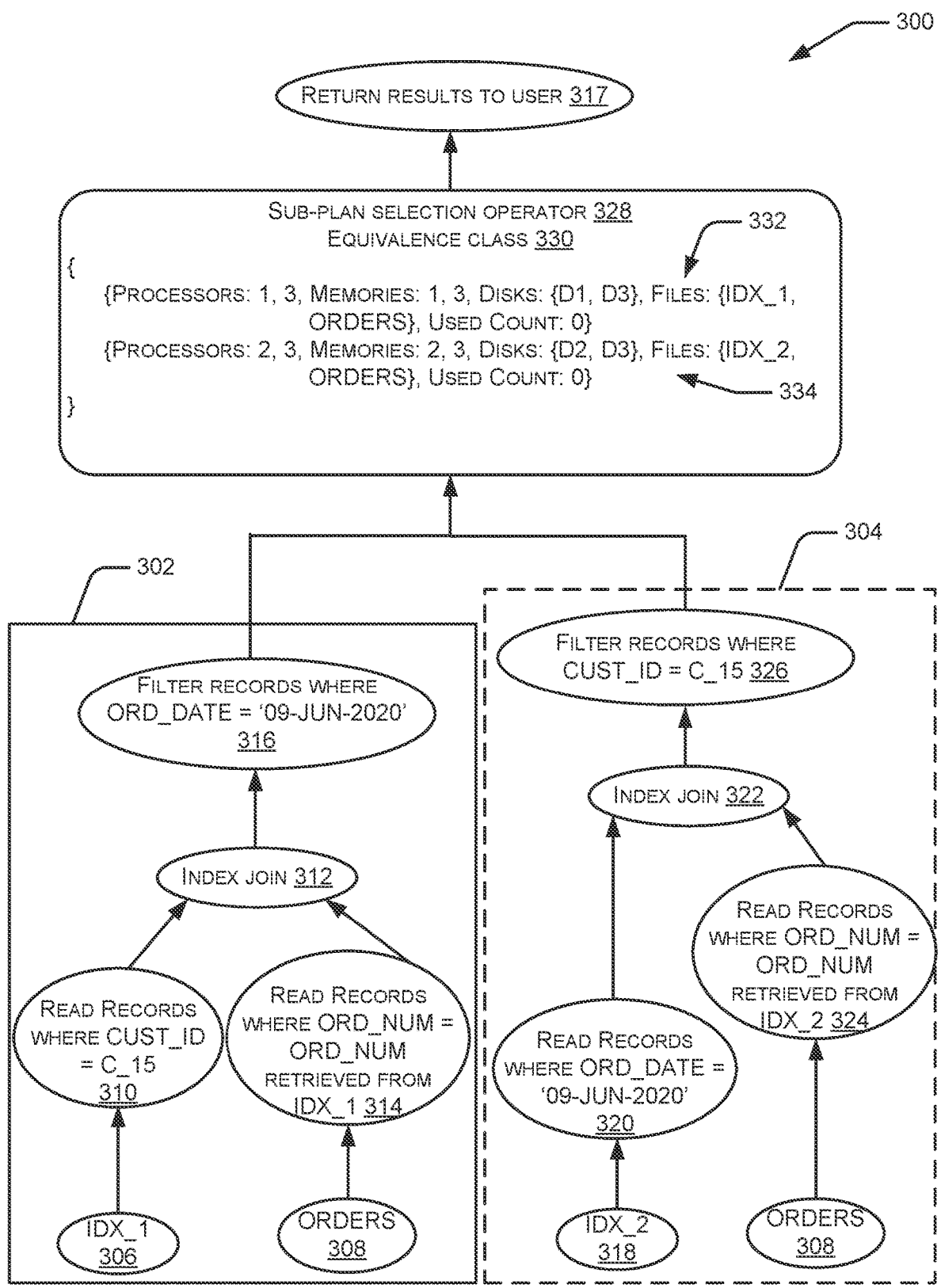
FIG. 3 illustrates a query plan generated by a query optimizer, according to an example implementation of the present subject matter.

FIG. 3 illustrates a query plan 300 generated by the query optimizer 216, according to an example implementation of the present subject matter. The arrows in the query plan 300, which point in the upward direction, indicate the direction of movement of data for execution of the query plan 300.

A query plan may be represented in the form of a tree structure having a plurality of nodes. When the query plan is represented in the form of a tree structure, the query plan may also be referred to as a query tree. The leaf nodes in the query plan may represent the tables that are to be accessed for executing the query plan. Further, the non-leaf nodes in the query plan may specify an operation to be performed on the tables at the leaf nodes and/or intermediate tables obtained as a result of other operations, that will help in returning a result for a query. The operations specified by the non-leaf nodes may be, for example, reading records, performing join operations, filtering records based on a condition, and outputting results to the client. The non-leaf nodes may include instructions that can be executed by a computing device for executing the query plan. The non-leaf nodes may also be referred to as operators.

A query plan generated by the query optimizer 216 may include a plurality of equivalent sub-plans. For instance, the query plan 300 includes a first sub-plan 302 and a second sub-plan 304. The first sub-plan 302 may include a first index node 306 and an orders node 308 as leaf nodes, which represent the first index and the ORDERS table respectively. A node 310 includes a read operator that specifies that records in the first index involving the customer are to be read. The read operation may be performed by the first computing device 208, as it corresponds to the first disk 202 that stores the first index. The read operation may be performed on receipt of an instruction to that effect from the system 100, which received the query 218. The read operation identifies order numbers of orders placed by the customer C_15.

The records read from the first index may be provided to a node 312 including an index join operator. The index join operator causes joining of the records read from the first index with the corresponding records in the ORDERS table. To perform the joining, the index join operator may pass on information of the records read from the first index to a node 314. The node 314 includes a read operator that specifies that records in the ORDERS table corresponding to the identified order numbers are to be read. The read operation may be performed by the third computing device 212, as the third computing device 212 corresponds to the third disk 206 that stores the ORDERS table. The read operation may be performed on receipt of an instruction to that effect from the system 100. The records read from the ORDERS table may be passed on to the node 312. The node 312 provides the results of the index join operation of the ORDERS table and the first index.

In an example, the nodes 310 and 314 may be provided below the node 312. Further, the node 310 may be provided to the left-hand side of the node 312 and the node 314 may be provided to the right-hand side of the node 312, as illustrated. This is because, during the traversal of the query plan 300 for execution, a child node of the node 312 to the left-hand side of the node 312 (which is the node 310) is traversed and executed before the child node to the right-hand side of the node 314. The traversal of the query plan 300 will be explained later.

A node 316 specifies that those records that have Jun. 9, 2020 as the order date are to be filtered from the records that are obtained from the execution of the node 312. The filtering operation may be performed, for example, by the third computing device 212 in response to an instruction from the system 100 or by the system 100. A node 317 may cause returning of the filtered records to the client that sent the query 218.

The second sub-plan 304 may include a second index node 318 and the orders node 308 as leaf nodes, which represent the second index and the ORDERS table respectively. A node 320 includes a read operator that specifies that records in the second index placed on Jun. 9, 2020 are to be read. The read operation may be performed by the second computing device 210, as the second computing device 210 corresponds to the second disk 204 that stores the second index. The read operation identifies order numbers of orders placed on Jun. 9, 2020. A node 322 includes an index join operator that causes joining of the records read from the second index with the corresponding records in the ORDERS table. To perform the joining, the index join operator may pass on information of the records read from the second index to a node 324. The node 324 includes a read operator that specifies that records in the ORDERS table corresponding to the order numbers identified on execution of the node 320 are to be read. The read operation may be performed by the third computing device 212. The node 322 provides the results of the index join operation of the ORDERS table and the second index. In an example, the nodes 320 and 324 may be provided below the node 322 and to the left-hand side and right-hand side of the node 322 respectively. A node 326 specifies that those records that were placed by the customer C_15 are to be filtered from the records that are obtained from the execution of the node 322. The node 317 may return the filtered records as a response to the query 218.

Although not shown, in an example, a sub-plan may also specify the components that are to be involved in its execution. Further, a sub-plan may also be referred to as an execution path, as it specifies the path to be followed for obtaining an output.

The system 100 may select one of the first sub-plan 302 and the second sub-plan 304 for execution during execution of the query plan 300. The selection may be based on the runtime performance parameters of components that are to be involved in the execution of the first sub-plan 302, such as the first index, the ORDERS table, the first processor, the first memory, a third processor (processor of the third computing device 212), a third memory (a memory of the third computing device 212), the first disk 202, and the third disk 206. The selection may be based also on the runtime performance parameters of components that are to be involved in the execution of the second sub-plan 304, such as the second index, the ORDERS table, the second processor, the second memory, the third processor, the third memory, the second disk 204, and the third disk 206. The selection may be performed at runtime, i.e., during execution of the query plan 300 and just before one of the first sub-plan 302 and the second sub-plan 304 is to be executed. Accordingly, the selection of sub-plan is performed based on values of the runtime performance parameters existing at the time of execution of the sub-plan. Thus, if, based on runtime performance parameters, it is determined that a component involved in execution of the second sub-plan 304 is heavily loaded, and that components involved in execution of the first sub-plan 302 are lightly or moderately loaded, the first sub-plan 302 may be selected. The first sub-plan 302 is shown in solid lines and the second sub-plan 304 is shown in dotted lines to indicate the selection of the first sub-plan 302 over the second sub-plan 304.

To indicate the presence of equivalent sub-plans and to facilitate the selection of one of the equivalent sub-plans for execution, the query optimizer 216 may provide a sub-plan selection operator 328 in the query plan 300. Similar to other operators, the sub-plan selection operator 328 may be provided as a node on the query plan 300. Further, the sub-plan selection operator 328 may be provided as a node from which the equivalent sub-plans branch out, as illustrated.

The sub-plan selection operator 328 may indicate the sub-plans to which it corresponds, such as the first sub-plan 302 and the second sub-plan 304. Further, the sub-plan selection operator 328 may also indicate the components to be involved in execution of the first sub-plan 302 and components to be involved in execution of the second sub-plan 304. For the indications, the sub-plan selection operator 328 may include an equivalence class 330 that indicates the set of components to be involved in execution of each equivalent sub-plan. For instance, the equivalence class 330 includes a first entry 332 that indicates the components to be involved in the execution of the first sub-plan 302 and a second entry 334 that indicates the components to be involved in the execution of the second sub-plan 304. In addition to the components, an entry may also include a used count field to indicate a number of times a corresponding sub-plan has been selected for execution. The used count may be used for preventing lopsided selections of one of the equivalent sub-plans for multiple executions, as will be explained with reference to FIG. 4.

The execution of the sub-plan selection operator 328 may cause determination of the runtime performance parameters of the components to be involved in the first sub-plan 302 and of the components to be involved in the second sub-plan 304. The determination of the runtime performance parameters may be performed, for example, by the system 100 and will be explained with reference to FIG. 4. Further, the execution of the sub-plan selection operator 328 may also cause selection of one of the first sub-plan 302 and the second sub-plan 304. In an example, the sub-plan selection operator 328 may be executed by the computing device that received the query 218, which may be the system 100. Further, the sub-plan selection operator 328 may include the instructions 106 and 108, which cause the selection and execution of one of the first sub-plan 302 and the second sub-plan 304. Similarly, other sub-plan selection operators in other query plans may include similar instructions to cause the selection and execution of an equivalent sub-plan.

By causing the determination of the runtime performance parameters and the selection of the sub-plan to happen during the execution of the sub-plan selection operator 328 (which gets executed during the execution of the query plan 300), the present subject matter facilitates dynamic determination of the runtime performance parameters and selection of sub-plans.

In an example, during execution of the sub-plan selection operator, a runtime cost function of each sub-plan may be computed based on the runtime performance parameters. Subsequently, a sub-plan may be selected based on a comparison of the runtime performance cost functions of the different sub-plans. The selection of a sub-plan based on runtime cost functions will be explained with reference to FIG. 4.

In operation, for executing the query plan 300, the system 100 may begin traversal of the query plan 300 from the root of the query plan 300, i.e., the node 317, and move downwards. Accordingly, at the beginning of the execution of the query plan 300, the node 317 may be traversed and it may be determined that there are no results to be returned. Accordingly, the system 100 may move down the query plan 300 and reach the sub-plan selection operator 328. The sub-plan selection operator 328 may cause computation of the runtime cost function for the first sub-plan 302 and for the second sub-plan 304. Based on the runtime cost functions, the first sub-plan 302 may be selected. Subsequently, the system 100 may execute the first sub-plan 302 or part thereof or may instruct another computing device, such as the first computing device 208 or the third computing device 212, for executing the first sub-plan 302 or part thereof.

If the first sub-plan 302 is selected, the node 316 may be traversed first. Since there are no records available yet to be filtered, the node 312 may be traversed next. Since the node 312 has two child nodes, the child node to the left-hand side of the node 312, i.e., the node 310, may be traversed and the operation specified in that node, i.e., reading records from the first index, may be performed. Upon completion of the operation specified by the node 310, the results may be returned to the node 312. Subsequently, the node 314 may be traversed. The result of the operation at the node 314 may then be returned to the node 312. Subsequently, the result from the node 312, i.e., the records obtained after the index join operation, may be returned to the node 316. The traversal of the node 316 causes filtering of the records. The filtered records may then be returned to the sub-plan selection operator 328, which returns the filtered records to the node 317. The node 317 then returns the results in response to the query 218.

Although FIG. 3 is explained with reference to a query plan having two equivalent sub-plans, the present subject matter utilized for generating and executing query plans having more than two equivalent sub-plans. Further, a query plan may include more than one set of equivalent sub-plans, where an equivalent sub-plan of a first set is to receive an output of execution of equivalent sub-plan of a second set. In such a case, the first set of sub-plans may be disposed above the second set of sub-plans on the query plan (as data flows in an upward direction in a query plan). Further, the traversal of the query plan may start at the root of the query plan and move downwards, similar to the traversal of the query plan 300. Since the first set of sub-plans is encountered before the second set of sub-plans during the traversal, a sub-plan from among the first set of sub-plans may be selected based on the runtime performance parameters. Further, a part of the selected sub-plan that can be executed without receiving the input from a sub-plan of the second set may be executed. Subsequently, the traversal continues downwards, and when the second set of sub-plans is encountered, one of the second set is selected and executed. The result of the execution is then provided to the selected sub-plan of the first set. Thereafter, the execution of the selected sub-plan of the first set is completed. An example query plan having a plurality of sets of sub-plans and its traversal is explained with reference to FIG. 5.

In the above explanation, the equivalent sub-plans are explained with reference to a first sub-plan involving the use of a first index and a second sub-plan involving the use of a second index. However, as will be appreciated, the techniques of the present subject matter can be utilized in scenarios where three or more equivalent sub-plans, each utilizing a different index, may be formed. Further, the present subject matter can be utilized in scenarios where there is more than one copy of an index is available. For instance, consider that two copies of the first index are available. Accordingly, one sub-plan may involve the use of the first copy of the first index and another sub-plan may involve the use of the second copy of the first index. Further, one among the sub-plans may be selected based on the numbers of access requests per unit time for the first copy and the second copy, the latency of the disks storing the first copy and the second copy (if the first copy and the second copy are stored on different disks), busy times of the processors that are to read records from the first copy and the second copy, and the like. Thus, using the present subject matter, the time consumed for query execution may be reduced where multiple copies of an index file are stored. Thus, a database administrator may create multiple copies of an index file to leverage the techniques of the present subject matter and increase the speed of execution of query plans. Similarly, multiple copies of a table may also be created and utilized in query plans.

Figure 4:
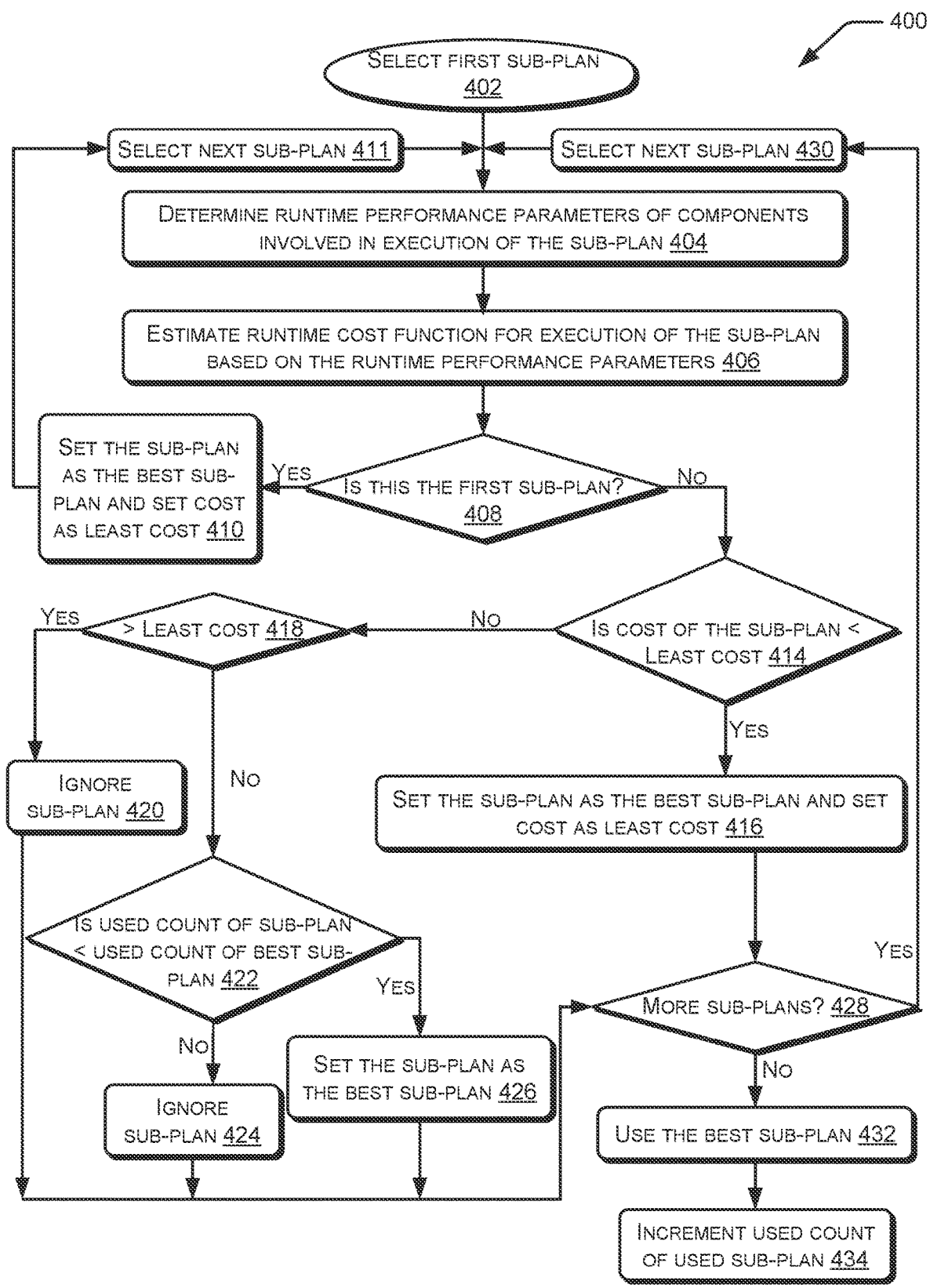
FIG. 4 illustrates a method for selection of a sub-plan from amongst a plurality of equivalent sub-plans, according to an example implementation of the present subject matter.

FIG. 4 illustrates a method 400 for selection of a sub-plan from amongst a plurality of equivalent sub-plans, according to an example implementation of the present subject matter. The order in which the method 400 is described is not intended to be construed as a limitation, and any number of the described method blocks may be combined in any order to implement the method 400, or alternative methods. Furthermore, the method 400 may be implemented by processing resource(s) or computing device(s) through any suitable hardware, non-transitory machine-readable instructions, or a combination thereof.

It may be understood that steps of the method 400 may be performed by programmed computing devices and may be executed based on instructions stored in a non-transitory computer readable medium. The non-transitory computer readable medium may include, for example, digital memories, magnetic storage media, such as magnetic disks and magnetic tapes, hard drives, or optically readable digital data storage media. Although the method 400 may be implemented in a variety of systems, the method 400 is described in relation to the system 100, for ease of explanation. In an example, the steps of the method 400 may be performed by a processing resource, such as the processor 102.

In an example, the method 400 may be performed when a sub-plan selection operator, such as the sub-plan selection operator 328, is executed. At block 402, a first sub-plan is selected for determination of runtime performance parameters. The first sub-plan may be an equivalent sub-plan corresponding to which an entry, such as the first entry 332, is present in an equivalence class, such as the equivalence class 330, of the sub-plan selection operator. The first sub-plan may be, for example, the first sub-plan 302. As explained earlier, the sub-plan selection operator may indicate a plurality of components to be involved in execution of the first sub-plan, also referred to as a first plurality of components.

At block 404, the runtime performance parameters of the first plurality of components may be determined. In an example, to determine the runtime performance parameters, various performance counters corresponding to the components may be leveraged. For instance, a counter associated with a processor may monitor the amount of time for which the processor is executing code. Similarly, a counter associated with a disk may monitor the workload of the disk. Such counters may directly provide the runtime performance parameters of the associated components. In an example, a service may receive an input regarding performance of a component and derive a runtime performance parameter based on the input.

At block 406, a runtime cost function is estimated for the first sub-plan based on the runtime performance parameters of the first plurality of components. The runtime cost function may provide a measure of workloads of the components and the time likely to be consumed for execution of the sub-plan. A higher value of the runtime cost function indicates that the workloads of the components involved is higher and that more time will be consumed for execution of the runtime cost function. In an example, to estimate the runtime cost function, a runtime performance parameter is compared against its corresponding reference value. The reference value may be the best possible value of the runtime performance parameter for a quick execution of the query plan. For instance, a reference value for the queue length of a disk may be zero, as zero is the least possible queue length and means that there are no pending requests with the disk and ensures that a record can be retrieved from the disk quickly. Similarly, a reference value for the latency of a disk may be 5 milliseconds, as 5 milliseconds may be the least possible value of the latency and may ensure a quick retrieval of records from the disk. Similarly, a reference value for the number of access requests per unit time for a file may be zero, which ensures quick lookup of records on the file. In this manner, reference values may be configured for other runtime performance parameters as well.

In an example, the comparison of the runtime performance parameters and their corresponding reference values may be performed by arranging the runtime performance parameters in a vector form and arranging the reference values in a vector form. For instance, consider that disks D1 and D2 and files F1 and F2 are involved in the first sub-plan. Consider also that two runtime performance parameters P1 and P2, such as queue length and latency, are considered for a disk and that one runtime performance parameter P3, such as number of access requests per unit time, is considered for a file. The runtime performance parameters P1 and P2 of the disks D1 and D2 may be $P1_{D1}$ and $P2_{D1}$ and $P1_{D2}$ and $P2_{D2}$, respectively. Further, the runtime performance parameter P3 of the files F1 and F2 may be $P3_{F1}$ and $P3_{F2}$, respectively. Accordingly, the runtime parameters may be arranged in a vector form as $(P1_{D1}, P2_{D1}, P1_{D2}, P2_{D2}, P3_{F1}, P3_{F2})$. The vector having runtime performance parameters of components involved in a sub-plan may be referred to as a sub-plan vector.

Further, the reference values of the runtime performance parameters may also be arranged in a vector form. Such a vector may be referred to as a reference vector. The reference vector may have the reference value for each runtime performance parameter in the sub-plan vector against which the reference vector is to be compared and may have the dimension as the sub-plan vector. For instance, consider that the reference values of the performance parameters P1, P2, and P3 are $P1_R$, $P2_R$, and $P3_R$, respectively. Accordingly, the reference vector may be arranged as $(P1_R, P2_R, P1_R, P2_R, P3_R, P3_R)$.

The arrangement of the reference vector in the form shown above allows comparison of the sub-plan vector with the reference vector. In an example, the comparison may be performed by computing a Euclidean distance between the sub-plan vector and the reference vector as per the equation provided below:

$$\sqrt{\begin{array}{l}(P1_{D1} - P1_R)^2 + (P2_{D1} - P2_R)^2 + (P1_{D2} - P1_R)^2 + \\ (P2_{D2} - P2_R)^2 + (P3_{F1} - P3_R)^2 + (P3_{F2} - P3_R)^2\end{array}} \qquad (1)$$

The Euclidean distance as computed above may be the runtime cost function corresponding to the first sub-plan, and may be referred to as the first runtime cost function or first runtime cost. As will be understood, a lower value of the runtime cost function indicates that the runtime performance parameters of the components are closer to their reference values, and therefore, indicates that the corresponding sub-plan is likely to execute in a short span of time. In an example, the runtime cost function may be estimated also based on network latency in a communication between a computing device that manages a disk and another computing device to which a record from the disk is to be returned for further processing. The runtime cost function may be determined also based on a rental cost of a processor that is involved in execution of a sub-plan.

Although runtime cost function is explained with reference to Euclidean distance, in an example, another technique to compare vectors in an n-dimensional space may be utilized to determine the runtime cost function.

If, at block 408, it is determined that the sub-plan for which the runtime cost function is computed is the first of the plurality of equivalent sub-plans indicated by the sub-plan selection operator, at block 410, the first sub-plan may be set as the best sub-plan and the runtime cost function for the first sub-plan may be set as the least cost. Subsequently, at block 411, the next sub-plan, such as the second sub-plan 304, indicated by the sub-plan selection operator may be selected. Further, a runtime cost for execution of the second sub-plan may be computed based on the runtime performance parameters of a second plurality of components that are to be involved in the second sub-plan. The runtime cost function corresponding the second sub-plan may be referred to as the second runtime cost function or the second runtime cost. The next sub-plan selected is explained as the second sub-plan in the following paragraphs. Further, the best sub-plan is explained as the first sub-plan.

If, at block 408, it is determined that the sub-plan for which the runtime cost function is computed is not the first of the plurality of equivalent sub-plans, at block 412, the second runtime cost function is compared with the least cost. If the second runtime cost function is determined to be less than the least cost, at block 416, the second sub-plan may be selected as the best sub-plan and the second runtime cost function may be set as the least cost. If, at block 418, the second runtime cost function is determined to be greater than the least cost, at block 420, the second sub-plan may be ignored.

If the second runtime cost function is same as the least cost, to determine whether to use the first sub-plan or the second sub-plan, a number of times the first sub-plan was selected for execution and a number of times the second sub-plan was selected for execution may be utilized. A number of times a sub-plan was selected may be referred to as a used count of the sub-plan. At block 422, the used count of the first sub-plan and that of the second sub-plan are compared. If the used count of the first sub-plan is less than that of the second sub-plan, at block 424, the second sub-plan may be ignored, and the first sub-plan may be retained as the best sub-plan. If, on the other hand, the used count of the second sub-plan is less than that of the first sub-plan, at block 426, the second sub-plan may be set as the best sub-plan. The setting of the sub-plan with lesser used counts as the best sub-plan helps uniform utilization of all available sub-plans. Accordingly, the components involved in different sub-plans may be utilized uniformly for execution of the query plan.

At block 428, it may be determined if there are more sub-plans indicated in the sub-plan selection operator. If yes, at block 430, the next sub-plan indicated may be selected, and the actions starting from block 404 may be repeated. If not, at block 432, the best plan may be utilized for execution of the query plan. Further, at block 434, the used count of the selected sub-plan is incremented by one.

The used count of sub-plans may be utilized for improving the query execution process. The system 100 may check for lopsided used counts of equivalent sub-plans, such as one equivalent sub-plan being selected and executed much more than another equivalent sub-plan. Upon detection of lopsided used counts, the system 100 may provide a feedback, for example, to a database administrator, that the components involved in the overused sub-plan may be overburdened and may suggest remedial actions. For instance, the system 100 may prompt creation of additional copies of indexes or movement of files from one disk to another. The system 100 may also learn, based on used counts, as to which sub-plans are more efficient and may designate the efficient sub-plans as default sub-plans. Subsequently, the default sub-plans may be used without a runtime selection in cases where the runtime selection is not to be performed (e.g., due to instruction of the database administrator).

Although the selection is explained as being performed based on the runtime cost function, in an example, a cost function determined based on the amount of resources to be consumed for execution of a sub-plan may also be utilized for the selection. Such a cost function may be referred to as a static cost function or a static cost. The static cost function may be determined, for example, based on statistics of tables that are to be involved in execution of a sub-plan. The static cost may be determined before execution of the query plan along with the runtime cost function. In an example, a weighted sum of the runtime cost function and the static cost function may be utilized for selecting a sub-plan.

Figure 5:
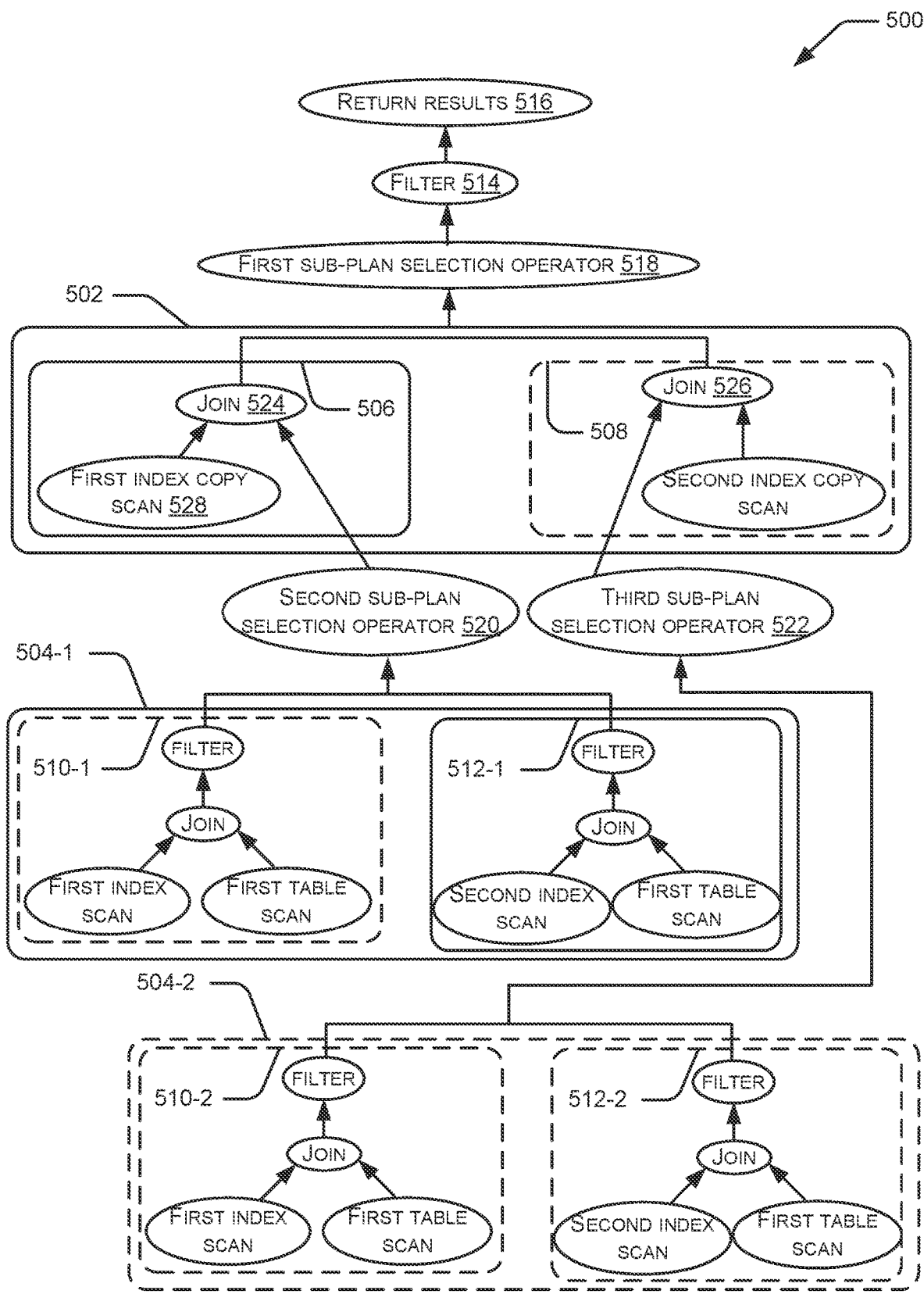
FIG. 5 illustrates a query plan generated by a query optimizer, according to an example implementation of the present subject matter.

FIG. 5 illustrates a query plan 500 generated by the query optimizer 216, according to an example implementation of the present subject matter. The query plan 500 includes a first set of equivalent sub-plans 502 and a second set of equivalent sub-plans 504, also referred to as the first set of sub-plans 502 and the second set of sub-plans 504. The first set of sub-plans 502 includes a first sub-plan 506 and a second sub-plan 508. The query plan 500 may include two copies of the second set of sub-plans 504, where the first copy 504-1 provides an output to the first sub-plan 506 and the second copy 504-2 provides an output to the second sub-plan 508, Each copy includes identical sets of sub-plans. For instance, the first copy 504-1 includes a first copy 510-1 of a third sub-plan and a first copy 512-1 of a fourth sub-plan and the second copy 504-2 includes a second copy 510-2 of the third sub-plan and a second copy 512-2 of the fourth sub-plan. The first copy 510-1 of the third sub-plan and the second copy 510-2 of the third sub-plan may be referred to as the third sub-plan 510. Similarly, the first copy 512-1 of the fourth sub-plan and the second copy 512-2 of the fourth sub-plan may be referred to as the fourth sub-plan 512.

Each copy of the third sub-plan (510-1 and 510-2) may involve an index join of a first index and a table (similar to the first sub-plan 302), while each copy of the fourth sub-plan (512-1 and 512-2) may involve an index join of a second index and the table (similar to the second sub-plan 304). An output of the first copy 510-1 of the third sub-plan or the first copy 512-1 of the fourth sub-plan (whichever is selected and executed) may be provided as input to the first sub-plan 506 (if the first sub-plan 506 is selected). Similarly, an output of the second copy 510-2 of the third sub-plan or the second copy 512-2 of the fourth sub-plan (whichever is selected and executed) may be provided as input to the second sub-plan 508 (if the second sub-plan 508 is selected). It may be noted that both copies of the third sub-plan 510 perform the same functions and differ in terms of the sub-plan to which they provide their respective outputs. Similarly, both copies of the fourth sub-plan 512 perform the same functions and differ in terms of the sub-plan to which they provide their respective outputs.

The first sub-plan 506 may involve an index join of first copy of an index and the result obtained from the execution of one of the second set of sub-plans 504, while the second sub-plan 508 may involve a second copy of the index and the result obtained from the execution of one of the second set of sub-plans 504. An output of the first sub-plan 506 or the second sub-plan 508 may be filtered at node 514 and may be returned as a response to a database query at node 516.

The query plan 500 may include a first sub-plan selection operator 518 to select one among the first sub-plan 506 and the second sub-plan 508 for execution. The query plan 500 may also include a second sub-plan selection operator 520 to select one among the first copy 510-1 of the third sub-plan and the first copy 512-1 of the fourth sub-plan and to provide the output of the selected sub-plan to the first sub-plan 506 if the first sub-plan 506 is selected. The query plan 500 may further include a third sub-plan selection operator 522 to select one among the second copy 510-2 of the third sub-plan and the second copy 512-2 of the fourth sub-plan and to provide the output of the selected sub-plan to the second sub-plan 508 if the second sub-plan 508 is selected.

The traversal of the query plan 500 for execution will now be explained. Similar to the traversal of the query plan 300, the traversal of the query plan 500 may begin at the root node of the query plan, i.e., at the node 516. Since no operation is to be performed at the node 516 and the node 514, the system 100 may traverse the first sub-plan selection operator 518, The first sub-plan selection operator 518 may cause computation of the runtime cost function of the first sub-plan 506 and the second sub-plan 508 based on the runtime performance parameters of the components to be involved in the execution. The components involved in execution of the first sub-plan 506 may include, for example, the first copy of the index, a disk storing the first copy, a processor that is to perform the scan of the first copy, and a processor that is to perform the join operation at a node 524. Similarly, the components involved in execution of the second sub-plan 508 may include, for example, the second copy of the index, a disk storing the second copy, a processor that is to perform the scan of the second copy, and a processor that is to perform the join operation at a node 526. Based on the runtime cost functions, one of the sub-plans, such as the first sub-plan 506 may be selected.

Further, the execution of the first sub-plan 506 may be commenced, for example, by traversing the node 524 and then a node 528 (which is a child node of the node 524 and is to the left of the node 524). Upon traversing the node 528, a scan of the first copy of the index is performed. Since the child node to the right of the node 524 is the second sub-plan selection operator 520, the runtime cost functions of the first copy 510-1 of the third sub-plan and of the first copy 512-1 of the fourth sub-plan are computed and one of the sub-plans is selected. The selected sub-plan, which may be the first copy 512-1 of the fourth sub-plan, may be executed and the output may be provided to the second sub-plan selection operator 520. The second sub-plan selection operator 520 may provide the output to the node 524 for completing the execution of the first sub-plan 506. It may be noted that the selection of one of the second set of equivalent sub-plans 504 is performed just before one of the sub-plans is to be executed. Thus, according to the present subject matter, a sub-plan to be executed is selected just before execution of the sub-plan even in cases where query plans include multiple sets of sub-plans.

The deferred selection, as explained above, provides a significant savings of time consumed for execution of a query plan. For instance, consider that two sets of equivalent sub-plans are to be executed. The selection of a sub-plan from the first set of equivalent sub-plans may be performed at time T based on the runtime performance parameters at the time T. Further, the selection of a sub-plan from the second set of equivalent sub-plans may be performed at time T+U based on the runtime performance parameters at the time T+U. The time difference U, between the first selection and the second selection may be large, such as a few hours, in the case of a long-running query plan. During this time, the runtime performance parameters may have varied. By deferring the second selection, the selection of a sub-plan that would have caused utilization of overloaded components is avoided and the sub-plan that can provide the better performance is selected.

Although the traversal of the query plan is explained with the help of a query plan having two sets of sub-plans, it will be understood that the traversal as explained above can be extended for query plans having more sets of sub-plans. Although the selection of sub-plans is explained with reference to sub-plans based on index join operations, the present subject matter can be used for generating and selecting other types of sub-plans as well. For instance, a query plan may have different types of join operations, such as a plan to perform a nested loop join, a plan to perform a hash join, and a plan to perform a merge join, as join sub-plans. Further, one of the join sub-plans may be selected for performing a join operation based on runtime performance parameters of a computing device, such as busy time of processor of the computing device and amount of available memory, that is to execute the query plan. Although query plans are explained with the help of tree structures, it is to be understood that the query plans may be implemented using other types of the data structures as well.

In an example, an equivalent sub-plan may be generated dynamically during execution of a query plan. Upon generation of the equivalent sub-plan, the runtime cost function corresponding to the sub-plan may be computed and compared with that corresponding to the other equivalent sub-plans. For instance, the second sub-plan 304 or the second sub-plan 508 may be generated during execution of the query plan 300 or the query plan 500, respectively. Such a generation may happen, for example, when a sub-plan selection operator is traversed during the execution. For instance, when the sub-plan selection operator 328 is traversed during execution of the query plan 300, a sub-plan equivalent to the first sub-plan 302 may be generated, and the corresponding details may be added to the equivalence class 330. The generation of a new sub-plan may involve querying a database catalog for existence of a new index on a table or a new copy of an index which may have been created after generation of the query plan. To facilitate the dynamic generation of the sub-plans, the sub-plan selection operator may include instructions to generate an equivalent sub-plan. Accordingly, the sub-plan selection operator may act as a 'mini' query optimizer that generates sub-plans that can be executed to obtain a result (intermediate or final). The dynamic generation of equivalent sub-plans allows leveraging new indexes and new tables that are generated after generation of the query plans, thereby further increasing speed of execution of the sub-plans.

Figure 6:
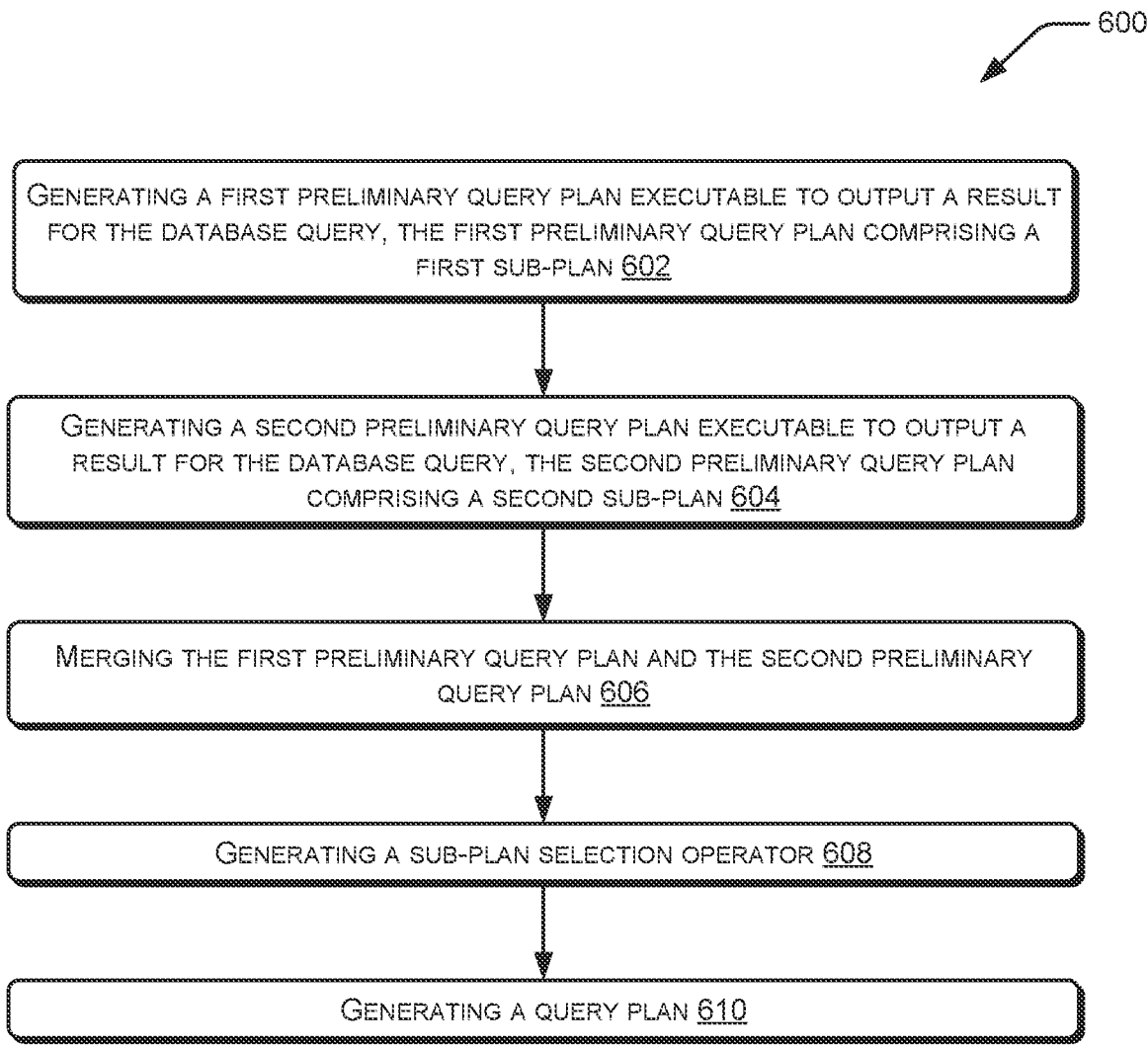
FIG. 6 illustrates a method for generation of a query plan, according to an example implementation of the present subject matter.
Figure 7:
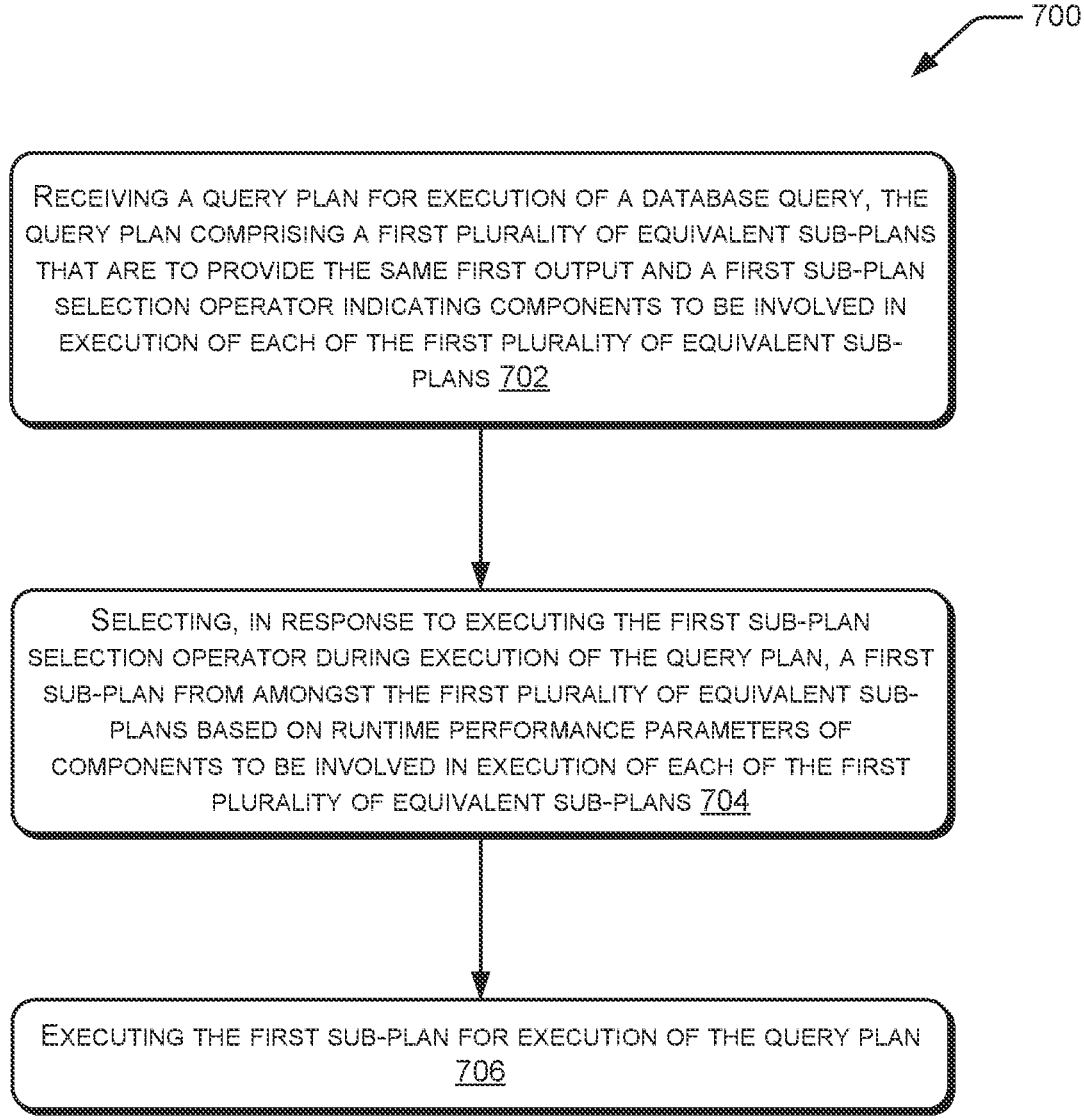
FIG. 7 illustrates a method for executing a query plan, according to an example implementation of the present subject matter.

FIG. 6 and FIG. 7 illustrate methods 600 and 700 for generation of a query plan and for execution of a query plan respectively, according to example implementations of the present subject matter. The orders in which the methods 600 and 700 are described are not intended to be construed as a limitation, and any number of the described method blocks may be combined in any order to implement the methods 600 and 700, or alternative methods. Furthermore, the methods 600 and 700 may be implemented by processing resource(s) or computing device(s) through any suitable hardware or hardware executing instructions encoded on non-transitory machine-readable medium.

It may be understood that blocks of the methods 600 and 700 may be performed by programmed computing devices and may be executed based on instructions stored in a non-transitory computer readable medium. The non-transitory computer readable medium may include, for example, digital memories, magnetic storage media, such as magnetic disks and magnetic tapes, hard drives, or optically readable digital data storage media. Further, although the methods 600 and 700 may be implemented in a variety of systems, the methods 600 and 700 are described in relation to the system 100, for ease of explanation. In an example, the blocks of the methods 600 and 700 may be performed by a processing resource, such as the processor 102.

Referring to FIG. 6, the method 600 for the generation of a query plan, such as the query plan 300 and the query plan 500, is illustrated. The operations at blocks of the method 600 may be performed, for example, by the query optimizer 216.

At block 602, a first preliminary query plan is generated for providing a result to a query. The first preliminary query plan may include a first sub-plan, such as the first sub-plan 302, and not a second sub-plan, such as the second sub-plan 304. At block 604, a second preliminary query plan is generated for providing the result to the query. The second preliminary query plan may include the second sub-plan, and not the first sub-plan. The first sub-plan and the second sub-plan may provide the same output, as explained earlier. The first preliminary query plan and the second preliminary query plan may each be provided as tree structures having plurality of nodes. Further, the first preliminary query plan and the second preliminary query plan and can be independently executed to provide the result to the query.

At block 606, the first preliminary query plan and the second preliminary query plan may be merged. The merging may involve removing duplicate nodes among the first preliminary query plan and the second preliminary query plan. For instance, if a first node in the first preliminary query plan and a second node in the second preliminary query plan perform the same function, one of the first node and the second node may be discarded. The merging may also involve providing sub-plans from the first preliminary query plan and the second preliminary query plan that are to provide the same output as equivalent sub-plans. For instance, since the first sub-plan and the second sub-plan provide the same output, they may be provided as equivalent sub-plans. In an example, to provide two sub-plans as equivalent sub-plans, the two sub-plans may provide output to the same node in the merged query plan.

In an example, not all preliminary query plans generated may be merged. Instead, the static costs of each of the preliminary query plans may be compared and a subset of those preliminary query plans having low static costs may be selected for merging. For instance, two preliminary query plans having the least static cost and the second-least static cost may be selected for being merged. In a further example, the preliminary query plan with the least static cost is merged with other preliminary query plans having a static cost comparable with that of the least static cost, such as less than 120% of the least static cost. The selection of preliminary query plans for merging based on the static cost ensures that due weightage is given for the static cost.

At block 608, a sub-plan selection operator, such as the sub-plan selection operator 328, may be generated. The sub-plan selection operator may indicate the presence of equivalent sub-plans and may cause selection of one of the equivalent sub-plans, as explained earlier. In an example, a sub-plan selection operator may be provided corresponding to each set of equivalent sub-plans in the query plan. For instance, a sub-plan selection operator may be provided for selection from amongst the first sub-plan and the second sub-plan and another sub-plan selection operator may be provided for selection from amongst a third sub-plan and a fourth sub-plan. In an example, the sub-plan selection operator may be provided as a node from which the corresponding equivalent sub-plans branch out, as illustrated in FIGS. 3 and 5.

At block 610, a query plan, such as the query plan 300 or the query plan 500, is generated. The query plan includes the sub-plan selection operator and the equivalent sub-plans.

FIG. 7 illustrates the method 700 for executing a query plan, according to an example implementation of the present subject matter. The method may be performed, for example, by the system 100.

At block 702, a query plan, such as the query plan 300 or the query plan 500, for execution of a database query is received. The query plan may include a first plurality of equivalent sub-plans that are to provide the same first output. The first plurality of equivalent sub-plans may include, for example, a first sub-plan and a second sub-plan, such as the first sub-plan 302 and the second sub-plan 304, or the first sub-plan 506 and the second sub-plan 508. The query plan may also include a first sub-plan selection operator, such as the sub-plan selection operator 328 or the first sub-plan selection operator 518, indicating components to be involved in execution of each of the first plurality of equivalent sub-plans.

At block 704, the first sub-plan is selected from amongst the first plurality of equivalent sub-plans for execution. The selection may be performed in response to execution of the first sub-plan selection operator, which is executed during execution of the query plan. The selection is performed based on runtime performance parameters of components to be involved in execution of each of the first plurality of equivalent sub-plans, such as components to be involved in execution of the first sub-plan and components to be involved in execution of the second sub-plan, as explained earlier.

In an example, the components to be involved in execution of the first sub-plan may include a first processor that is to execute at least a part of the first sub-plan. Further, the runtime performance parameters of components include a busy time of the first processor. Accordingly, the method 700 may also include determining the busy time of the first processor prior to selecting the first sub-plan. The determination of the busy time may be based on counter values provided by a performance counter associated with the first processor, as explained earlier.

In an example, selecting the first sub-plan includes comparing the runtime performance parameters of components involved in execution of the first sub-plan with reference values of the runtime performance parameters and comparing the runtime performance parameters of components involved in execution of the second sub-plan with reference values of the runtime performance parameters. For instance, a first Euclidean distance may be computed between the runtime performance parameters of components to be involved in execution of the first sub-plan with the reference values of the runtime performance parameters. Further, a second Euclidean distance may be computed between runtime performance parameters of components to be involved in execution of the second sub-plan with the reference values of the runtime performance parameters. Subsequently, the first sub-plan is selected based on a comparison of the first Euclidean distance and the second Euclidean distance. For instance, the first sub-plan may be selected if the first Euclidean distance is less than the second Euclidean distance, as explained with reference to FIG. 4. The first Euclidean distance and the second Euclidean distance may be referred to as a first runtime cost function and a second runtime cost function respectively. At block 706, the first sub-plan is executed for execution of the query plan.

In an example, the query plan includes a second plurality of equivalent sub-plans that are to provide the same second output and a second sub-plan selection operator. The second plurality of equivalent sub-plans may be, for example, the second set of sub-plans 504 and may include a third sub-plan and a fourth sub-plan. The second sub-plan selection operator may be, for example, the second sub-plan selection operator 520. The second sub-plan selection operator may indicate components to be involved in execution of each of the second plurality of equivalent sub-plans. The method 700 may include selecting, in response to executing the second sub-plan selection operator during execution of the query plan, a sub-plan from amongst the second plurality of equivalent sub-plans based on runtime performance parameters of the components to be involved in execution of the second plurality of equivalent sub-plans, as explained with reference to FIG. 5.

In an example, during execution of the query plan, execution of one of the first plurality of equivalent sub-plans is to commence before commencement of execution of one of the second plurality of equivalent sub-plans. For instance, as explained with reference to FIG. 5, the execution of one of the first sub-plan 506 and the second sub-plan 508 is commenced before commencing execution of the third sub-plan 510 or the fourth sub-plan 512. Further, the method may include commencing execution of the first sub-plan upon selection of the first sub-plan and selecting one of the second plurality of equivalent sub-plans for execution upon commencing execution of the first sub-plan. In this manner, the selection of sub-plans may be made at runtime.

In an example, a first number of times of selection of the first sub-plan for execution and a second number of times of selection of the second sub-plan are determined. A number of times of selection of a sub-plan may be, for example, a used count value of the sub-plan. As explained with reference to FIG. 4, the used count value of a sub-plan is initialized at zero and is incremented by one for each selection of the sub-plan. In response to the first number of times being greater than the second number of times by more than a threshold number of times, a notification may be provided, for example, to reduce workload of the components to be involved in execution of the first sub-plan. Alternatively, a feedback may be provided to indicate the first sub-plan as a default sub-plan. In another example, both the notification and the feedback may be provided. In an example, if two sub-plans have the same or comparable runtime costs, the sub-plan having the lesser used count of the two may be selected for execution. Such a selection based on the used counts prevents lopsided selections of sub-plans.

Figure 8:
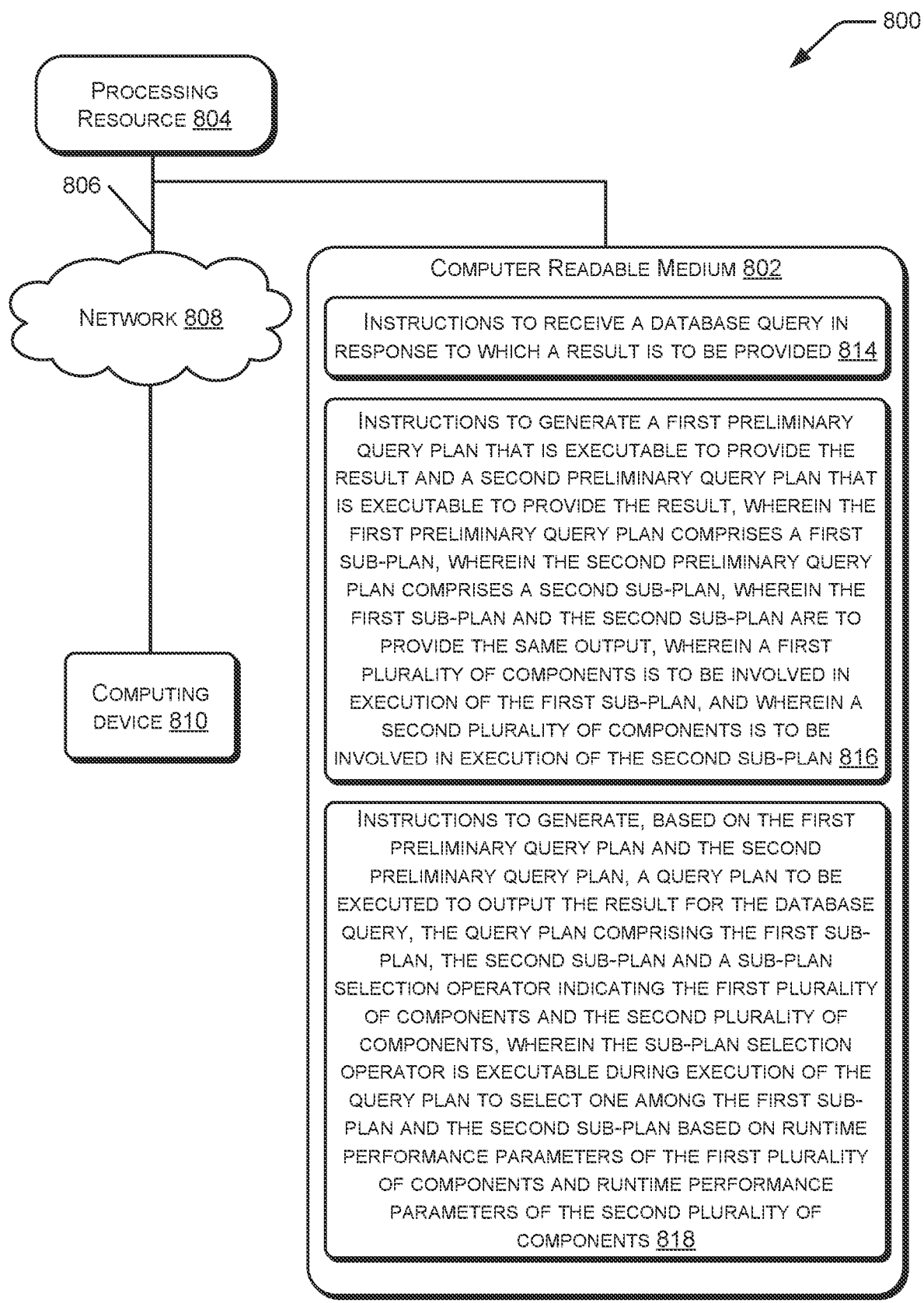
FIG. 8 illustrates a computing environment implementing a non-transitory computer-readable medium for generating a query plan, according to an example implementation of the present subject matter.

FIG. 8 illustrates a computing environment 800 implementing a non-transitory computer-readable medium for generating a query plan, according to an example implementation of the present subject matter. In an example, the non-transitory computer-readable medium 802 may be utilized by a system, such as the system 100. In an example, the computing environment 800 may include a processing resource 804 communicatively coupled to the non-transitory computer-readable medium 802 through a communication link 806. The processing resource 804 may be, for example, the processor 102.

The non-transitory computer-readable medium 802 may be, for example, an internal memory device or an external memory device. In an example, the communication link 806 may be a direct communication link, such as any memory read/write interface. In another example, the communication link 806 may be an indirect communication link, such as a network interface. In such a case, the processing resource 804 may access the non-transitory computer-readable medium 802 through a network 808. The network 808 may be a single network or a combination of multiple networks and may use a variety of different communication protocols.

The processing resource 804 and the non-transitory computer-readable medium 802 may also be communicatively coupled to a computing device 810, which may be a computing device that is to execute the query plan generated or a part thereof.

In an example implementation, the non-transitory computer-readable medium 802 includes a set of computer-readable instructions for generation of query plans. The set of computer-readable instructions can be accessed by the processing resource 804 through the communication link 806 and subsequently executed. The set of computer-readable instructions may implement, for example, the query optimizer 216.

Referring to FIG. 8, in an example, the non-transitory computer-readable medium 802 includes instructions 814 that cause the processing resource 804 to receive a database query in response to which a result is to be provided. The database query may be, for example, the query 218.

The non-transitory computer-readable medium 802 includes instructions 816 to generate a first preliminary query plan that is executable to provide the result and a second preliminary query plan that is executable to provide the result. The first preliminary query plan comprises a first sub-plan, such as the first sub-plan 302, and the second preliminary query plan includes a second sub-plan, such as the second sub-plan 304. The first sub-plan and the second sub-plan are to provide the same output, as explained earlier. A first plurality of components is to be involved in execution of the first sub-plan and a second plurality of components is to be involved in execution of the second sub-plan.

In an example, the first plurality of components includes a first processor that is to execute at least a part of the first sub-plan, a first memory coupled to the first processor, a first file that is to be accessed to execute the first sub-plan, a first disk storing the first file, or any combination thereof. Further, the second plurality of components includes a second processor that is to execute at least a part of the second sub-plan, a second memory coupled to the second processor, a second file that is to be accessed to execute the second sub-plan, a second disk storing the second file, or any combination thereof.

The non-transitory computer-readable medium 802 includes instructions 818 to generate, based on the first preliminary query plan and the second preliminary query plan, a query plan to be executed to output the result for the database query. The query plan may include the first sub-plan, the second sub-plan, and a sub-plan selection operator. The sub-plan selection operator may indicate the first plurality of components and the second plurality of components. The sub-plan selection operator is executable during execution of the query plan to select one among the first sub-plan and the second sub-plan based on runtime performance parameters of the first plurality of components and runtime performance parameters of the second plurality of components, as explained earlier. In an example, the generation of the query plan may be performed by merging the first preliminary query plan and the second preliminary query plan and inserting a sub-plan selection operator, as explained with reference to FIG. 6.

In an example, the instructions are executable to generate the query plan as a tree structure having the sub-plan selection operator as a node, and a node of the first sub-plan and a node of the second sub-plan as child nodes of the sub-plan selection operator, as illustrated in FIGS. 3 and 5. In an example, the instructions are executable to generate a plurality of preliminary query plans including the first preliminary query plan and the second preliminary query plan, each executable to provide the result. Further, the first preliminary query plan and the second preliminary query plan may be selected from amongst the plurality of preliminary query plans for generation of the query plan based on statistics of a database table to be accessed to execute the first preliminary query plan and statistics of a database table to be accessed to execute the second preliminary query plan. For instance, as explained earlier, static costs of the preliminary query plans may be computed based on the statistics of the tables to be accessed for executing the preliminary query plans and the preliminary query plans to be merged may be selected based on the static costs, as explained earlier.

In an example, the non-transitory computer-readable medium 802 includes instructions to execute the query plan generated. Such instructions may be, for example, the instructions that implement the query executor 220. Accordingly, the non-transitory computer-readable medium 802 may be executed for selection of a sub-plan during execution of the query plan.

The present subject matter reduces the time consumed for execution of a query plan by providing equivalent sub-plans in a query plan and the selecting a sub-plan based on runtime performance parameters of components involved in the sub-plan. Further, by deferring the selection of an equivalent sub-plan to the time of execution of the sub-plan, the present subject matter ensures that the selection is based on the current performance parameters. The present subject matter can be utilized in scenarios where workloads of components involved vary dynamically.

The present subject matter may be utilized in static scenarios, where a query plan is generated once, stored, and executed multiple times, as the selection of sub-plans is performed dynamically during execution of the query plan. Since the selection of a sub-plan is performed at the time of its execution, the selection may be performed based on the health of the components involved in the execution. Thus, an attempt to execute a previously-selected query plan based on a faulty component may be avoided. The present subject matter also prevents failure of components, such as disks and computing devices, due to heavy workload. Overall, the present subject matter improves the query execution process.

The present subject matter can utilize multiple copies of an index to generate new sub-plans and use the sub-plans based on the workload of the copies. Thus, a database administrator may create multiple copies of an index file and leverage the techniques of the present subject matter to respond to queries quickly. Accordingly; the present subject matter can be utilized in scenarios, such as e-commerce applications, where indexes become overburdened due to multiple accesses. Further, multiple copies of tables may also be created and utilized. The utilization of multiple copies also increases fault tolerance in execution of query plans. For instance, the different copies may be stored on different devices, so that failure of one device does not affect execution of the query plan. Further, in the present subject matter, each individual query is independently processed and executed even in the presence of high system load, instead of looking at multiple queries together.

Although implementations of execution of query plans have been described in language specific to structural features and/or methods, it is to be understood that the present subject matter is not necessarily limited to the specific features or methods described. Rather, the specific features and methods are disclosed and explained as example implementations.

We claim:

1. A system comprising:
a processor; and
a memory comprising instructions executable by the processor to:
select, during execution of a query plan comprising a first sub-plan and a second sub-plan, the first sub-plan for execution, wherein the query plan is executable to provide a result for a database query, wherein the first sub-plan and the second sub-plan are to provide the same output, wherein a first hardware component is to be involved in execution of the first sub-plan and a second hardware component is to be involved in execution of the second sub-plan, wherein the selection is based on a runtime performance parameter of the first hardware component and a runtime performance parameter of the second hardware component; and
cause execution of the first sub-plan.

2. The system of claim 1, wherein the first hardware component is a first disk storing a first file to be used in execution of the first sub-plan, wherein the second hardware component is a second disk storing a second file to be used in execution of the second sub-plan, wherein the runtime performance parameter of the first hardware component comprises a number of access requests being processed by the first disk per unit time, a queue length of waiting requests pending with the first disk, and a latency of the first disk.

3. The system of claim 1, wherein the first hardware component is a first file to be accessed for execution of the first sub-plan, wherein the second hardware component is a second file to be accessed for execution of the second sub-plan, wherein the runtime performance parameter of the first hardware component is a number of access requests for the first file per unit time, and wherein the runtime performance parameter of the second hardware component is a number of access requests for the second file per unit time.

4. The system of claim 1, wherein a first plurality of hardware components is to be involved in execution of the first sub-plan, wherein a second plurality of hardware components is to be involved in execution of the second sub-plan, and wherein the instructions are executable to:
compute a first runtime cost for execution of the first sub-plan based on the runtime performance parameters of the first plurality of hardware components;
compute a second runtime cost for execution of the second sub-plan based on the runtime performance parameters of the second plurality of hardware components; and
select the first sub-plan for execution based on a comparison of the first runtime cost and the second runtime cost.

5. The system of claim 1, wherein a first file is to be accessed to execute the first sub-plan and a second file is to be accessed to execute the second sub-plan, wherein the instructions are executable to:

determine that the first sub-plan is to be executed based on a latency of a network that is to connect a computing device that manages a disk storing the first file and another computing device to which a record from the first file is to be returned for further processing and based on a latency of a network that is to connect a computing device that manages a disk storing the second file and another computing device to which a record from the second file is to be returned for further processing.

6. The system of claim 1, wherein the instructions are executable to select the first sub-plan based on a first rental cost of a first processor to be involved in execution of the first sub-plan and a second rental cost of a second processor to be involved in execution of the second sub-plan.

7. The system of claim 1, wherein the query plan comprises a sub-plan selection operator indicating the first sub-plan, the second sub-plan, the first hardware component, and the second hardware component and comprising the instructions to select the first sub-plan and the instructions to cause execution of the first sub-plan.

8. The system of claim 7, comprising instructions executable to generate the query plan, wherein the instructions are executable to:

generate a first preliminary query plan executable to provide a result for the database query, the first preliminary query plan comprising the first sub-plan;

generate a second preliminary query plan executable to provide a result for the database query, the second preliminary query plan comprising the second sub-plan;

merge the first preliminary query plan and the second preliminary query plan;

generate the sub-plan selection operator; and generate the query plan.

9. The system of claim 1, comprising instructions executable to generate the second sub-plan during execution of the query plan.

10. A method comprising:

receiving a query plan for execution of a database query, the query plan comprising:
  a first plurality of equivalent sub-plans that are to provide the same first output; and
  a first sub-plan selection operator indicating first hardware components to be involved in execution of each of the first plurality of equivalent sub-plans;

selecting, in response to executing the first sub-plan selection operator during execution of the query plan, a first sub-plan from amongst the first plurality of equivalent sub-plans based on runtime performance parameters of the first hardware components to be involved in execution of each of the first plurality of equivalent sub-plans; and executing the first sub-plan for execution of the query plan.

11. The method of claim 10, wherein the first hardware components to be involved in execution of the first sub-plan comprises a first processor that is to execute at least a part of the first sub-plan, wherein the runtime performance parameters of the first hardware components comprise a busy time of the first processor, and wherein the method comprises determining the busy time of the first processor prior to selecting the first sub-plan.

12. The method of claim 10, wherein the first plurality of equivalent sub-plans comprises a second sub-plan, wherein selecting the first sub-plan comprises:

comparing runtime performance parameters of the first hardware components to be involved in execution of the first sub-plan with reference values of the runtime performance parameters; and comparing the runtime performance parameters of the first hardware components to be involved in execution of the second sub-plan with the reference values of the runtime performance parameters.

13. The method of claim 12, comprising:

computing a first Euclidean distance between the runtime performance parameters of the first hardware components to be involved in execution of the first sub-plan with the reference values of the runtime performance parameters;

computing a second Euclidean distance between runtime performance parameters of the first hardware components to be involved in execution of the second sub-plan with the reference values of the runtime performance parameters; and selecting the first sub-plan based on a comparison of the first Euclidean distance and the second Euclidean distance.

14. The method of claim 10, wherein the query plan further comprises:

a second plurality of equivalent sub-plans that are to provide the same second output; and a second sub-plan selection operator indicating second hardware components to be involved in execution of each of the second plurality of equivalent sub-plans, wherein the method comprises:

selecting, in response to executing the second sub-plan selection operator during execution of the query plan, a sub-plan from amongst the second plurality of equivalent sub-plans based on runtime performance parameters of the second hardware components to be involved in execution of the second plurality of equivalent sub-plans.

15. The method of claim 10, wherein the query plan comprises a second plurality of equivalent sub-plans that are to provide the same second output, wherein, during execution of the query plan, execution of one of the first plurality of equivalent sub-plans is to commence before commencement of execution of one of the second plurality of equivalent sub-plans, wherein the method comprises:

commencing execution of the first sub-plan upon selection of the first sub-plan; and selecting one of the second plurality of equivalent sub-plans upon commencing execution of the first sub-plan for execution.

16. The method of claim 10, comprising:

determining a first number of times of selection of the first sub-plan;

determining a second number of times of selection of the second sub-plan; and in response to the first number of times being greater than the second number of times by more than a threshold number of times,
  providing a notification to reduce workload of the first hardware components to be involved in execution of the first sub-plan; or
  providing a feedback to indicate the first sub-plan as a default sub-plan.

17. A non-transitory computer-readable medium comprising instructions, the instructions being executable by a processing resource to:
- receive a database query in response to which a result is to be provided;
- generate a first preliminary query plan that is executable to provide the result and a second preliminary query plan that is executable to provide the result, wherein the first preliminary query plan comprises a first sub-plan, wherein the second preliminary query plan comprises a second sub-plan, wherein the first sub-plan and the second sub-plan are to provide the same output, wherein a first plurality of components is to be involved in execution of the first sub-plan, and wherein a second plurality of components is to be involved in execution of the second sub-plan; and
- generate, based on the first preliminary query plan and the second preliminary query plan, a query plan to be executed to output the result for the database query, the query plan comprising:
  - the first sub-plan;
  - the second sub-plan; and
  - a sub-plan selection operator indicating the first plurality of components and the second plurality of components, wherein the sub-plan selection operator is executable during execution of the query plan to select one among the first sub-plan and the second sub-plan based on runtime performance parameters of the first plurality of components and runtime performance parameters of the second plurality of components.

18. The non-transitory computer-readable medium of claim 17, wherein, the instructions are executable to generate the query plan as a tree structure having the sub-plan selection operator as a node, and wherein a node of the first sub-plan and a node of the second sub-plan are child nodes of the sub-plan selection operator in the tree structure.

19. The non-transitory computer-readable medium of claim 17, wherein the first plurality of components comprises a first processor that is to execute at least a part of the first sub-plan, a first memory coupled to the first processor, a first file that is to be accessed to execute the first sub-plan, or a first disk storing the first file, and wherein the second plurality of components comprises a second processor that is to execute at least a part of the second sub-plan, a second memory coupled to the second processor, a second file that is to be accessed to execute the second sub-plan, or a second disk storing the second file.

20. The non-transitory computer-readable medium of claim 17, wherein the instructions are executable to:
- generate a plurality of preliminary query plans, each executable to provide the result, the plurality of preliminary query plans comprising the first preliminary query plan and the second preliminary query plan; and
- select, from amongst the plurality of preliminary query plans, the first preliminary query plan and the second preliminary query plan for generation of the query plan based on statistics of a database table to be accessed to execute the first preliminary query plan and statistics of a database table to be accessed to execute the second preliminary query plan.

* * * * *